United States Patent
Flamang et al.

(10) Patent No.: US 7,090,465 B2
(45) Date of Patent: Aug. 15, 2006

(54) PLANET CARRIER ASSEMBLY FOR WIND TURBINE DRIVE ASSEMBLY

(75) Inventors: Peter Flamang, Antwerp (BE); Marcel De Wilde, Antwerp (BE); Warren Smook, Antwerp (BE)

(73) Assignee: Hansen Transmissions International NV, Antwerp (BE)

( * ) Notice: Subject to any disclaimer, the term of this patent is extended or adjusted under 35 U.S.C. 154(b) by 116 days.

(21) Appl. No.: 10/485,565

(22) PCT Filed: Aug. 1, 2002

(86) PCT No.: PCT/IB02/03596

§ 371 (c)(1),
(2), (4) Date: Jun. 7, 2004

(87) PCT Pub. No.: WO03/014566

PCT Pub. Date: Feb. 20, 2003

(65) Prior Publication Data

US 2004/0219020 A1    Nov. 4, 2004

(30) Foreign Application Priority Data

Aug. 3, 2001  (GB) .................................. 0118997.6

(51) Int. Cl.
*F03B 11/02* (2006.01)
(52) U.S. Cl. .................................. 416/170 R
(58) Field of Classification Search ................ 415/4.3, 415/4.5, 4.4, 70, 124.1; 416/170 R; 290/44, 290/55; 475/331, 348
See application file for complete search history.

(56) References Cited

U.S. PATENT DOCUMENTS 6,872,049 B1 *   3/2005   Christensen ............. 415/124.1

FOREIGN PATENT DOCUMENTS

| DE | 22 35 448 | 2/1974 |
|----|-----------|--------|
| DK | 174 085 | 6/2002 |
| EP | 0 811 764 | 12/1997 |
| EP | 0 821 161 A1 | 1/1998 |
| WO | 96/11338 | 4/1996 |
| WO | 02/14690 | 2/2002 |
| WO | WO 02/079644 A1 | 10/2002 |

* cited by examiner

*Primary Examiner*—Edward K. Look
*Assistant Examiner*—Devin Hanan
(74) *Attorney, Agent, or Firm*—Young & Thompson

(57) ABSTRACT

A drive assembly for a wind turbine (10) comprises a rotor hub (14), supporting structure such as a turbine nacelle (15), a planetary type gear transmission unit comprising sun, planet (47, 48) and ring gears (49) and a planet carrier (41), said planet carrier comprising a planet bogie plate (43) which supports and locates circumferentially spaced gear bearings (45, 46), said bearings (45, 46) being able, in use, to self adjust in angular position relative to the plate (43) whereby the rotational axes of the bearings (45, 46) may be either perpendicular to the general plane of the bogie plate (43) or depart therefrom.

20 Claims, 7 Drawing Sheets

PLANET CARRIER ASSEMBLY FOR WIND TURBINE DRIVE ASSEMBLY

This invention relates to a planet carrier assembly for a wind turbine drive assembly and for a gear transmission unit for a wind turbine.

There is a continuing demand for larger wind turbines especially for offshore sites due to scarcity of suitable sites and cost of civil works. At the same time the requirements for reduction of size and weight of the machines and their components become more and more important. Typically a wind turbine rotor drives the low speed shaft of a gear transmission unit, which transforms torque and speed of the rotor to the required torque and speed of an electrical generator.

Integration of the components in a wind turbine is a way to reduce the weight and to make the drive assembly more compact, but it is important that the design and execution of the drive assembly avoids mutual interference of the external and internal loads on the different components. It is also important that the construction of an integrated drive assembly allows effective lubrication to be achieved economically and reliably.

The present invention seeks to provide an improved drive assembly and an improved gear transmission unit for a wind turbine and which permits an advantageous integration of components.

In accordance with one aspect of the present invention a drive assembly for a wind turbine comprises a rotor hub, supporting structure such as a turbine nacelle, a planetary type gear transmission unit comprising sun, planet and ring gears and a planet carrier, said planet carrier comprising a planet bogie plate which supports and locates circumferentially spaced planet gear bearings, said bearings being able, in use, to self adjust in angular position relative to the plate whereby the rotational axes of the bearings may be either perpendicular to the general plane of the bogie plate or depart therefrom.

The bearings may support respective pairs of aligned planet gears, typically the two gears of each pair being positioned at opposite sides of the plate.

The bearing(s) for each circumferentially spaced planet gear position may be supported on a shaft which in use self adjusts in said angular position position relative to the bogie plate. Preferably movement of each shaft relative to the plate is as a result primarily of a rolling action between bearing surfaces, or a combination of rolling action and sliding movement. That is, relative movement is to involve a Hertzian type contact.

Other potential feature of the drive assembly include said ring gear being non-rotatably secured to said supporting structure, a main bearing which rotatably supports the rotor hub and planet carrier relative to said ring gear and supporting structure, and said drive assembly comprising two substantially independent force transmission paths for transmission of forces reacting with forces exerted by the wind turbine rotor hub, a first of said force transmission paths acting from the rotor hub via said main bearing to the supporting structure primarily for transmission of overhang load forces and bending moment forces and a second of said force transmission paths acting from the rotor hub via said planet carrier primarily for transmission of rotational forces.

In accordance with another aspect of the present invention a gear transmission unit for use in a wind turbine to transmit forces from a rotor hub to a generator comprises a planetary type gear transmission unit comprising sun, planet and ring gears and a planet carrier, and a planet bogie plate having features as described above, and hereinafter, in the context of a drive assembly.

Preferably, as considered in an axial direction parallel with the axis of rotation of the planet carrier, said main bearing lies at a position substantially aligned axially with the axial position of at least the ring gear of the gear transmission unit.

Preferably the sun, planet and ring gears lie in a transverse plane (perpendicular to the rotation axis of said rotational forces) which also contains said main bearing.

Other preferred features are that the main bearing comprises an inner ring bearing surface of a diameter greater than that of the toothed surface of the ring gear, and that at all radial positions inwards of the toothed surface of the ring gear the second force transmission path is substantially independent of the first force transmission path.

It is further preferred that the second of said force transmission paths comprises a radially extending torque transmission member which is torsionally stiff but relatively compliant in an axial direction parallel with the axis about which the rotational forces act whereby movement of the hub in consequence of bending forces is accommodated at least in part by deflection of the torque transmission member. The torque transmission member thereby isolates the gear transmission unit from the potentially damaging effects of bending deflections experienced by the rotor hub relative to the main rotational axis of the gear transmission unit.

The present invention accordingly provides, in a further of its aspects, a drive assembly in which the main rotor bearing and gear transmission unit for a wind turbine are of an integrated construction. The wind turbine rotor hub preferably is connected to the outer ring of the main bearing. The bearing inner ring preferably is supported by, and may be directly mounted on, the ring gear of the planetary gear stage, or on a flange which connects the ring gear to the supporting structure. In an alternative construction the ring gear may provide a bearing surface for rotatable bearing components of the main bearing.

The ring gear may provide axial and radial locations for the main bearing. The ring gear may have a radially outer surface of a stepped profile to define a shoulder for axial location of an inner bearing ring of the main bearing. The inner bearing ring may be secured axially between said shoulder and said supporting structure.

The ring gear may be provided with a reinforcing ring, and said reinforcing ring may extend axially and or radially beyond the toothed surface of the ring gear. Said reinforcing ring may provide an axial location of the main bearing.

The main bearing may comprise a double taper bearing, and said double taper bearing may comprise a single outer bearing ring. The rotor hub may be rigidly secured relative to said single outer bearing ring. The double taper bearing may comprise rollers arranged in an O configuration in which the rollers of one series increase in diameter in a direction away from the rollers of the other series of the pair.

In a yet further of its aspects the present invention provides a wind turbine comprising rotors, a generator and a drive assembly of a type in accordance with the present invention.

The gear transmission unit, e.g. a housing thereof, may be arranged to support an electrical generator.

The invention will now be described, by way of example only, with reference to the accompanying diagrammatic drawings in which.

Figure 2:
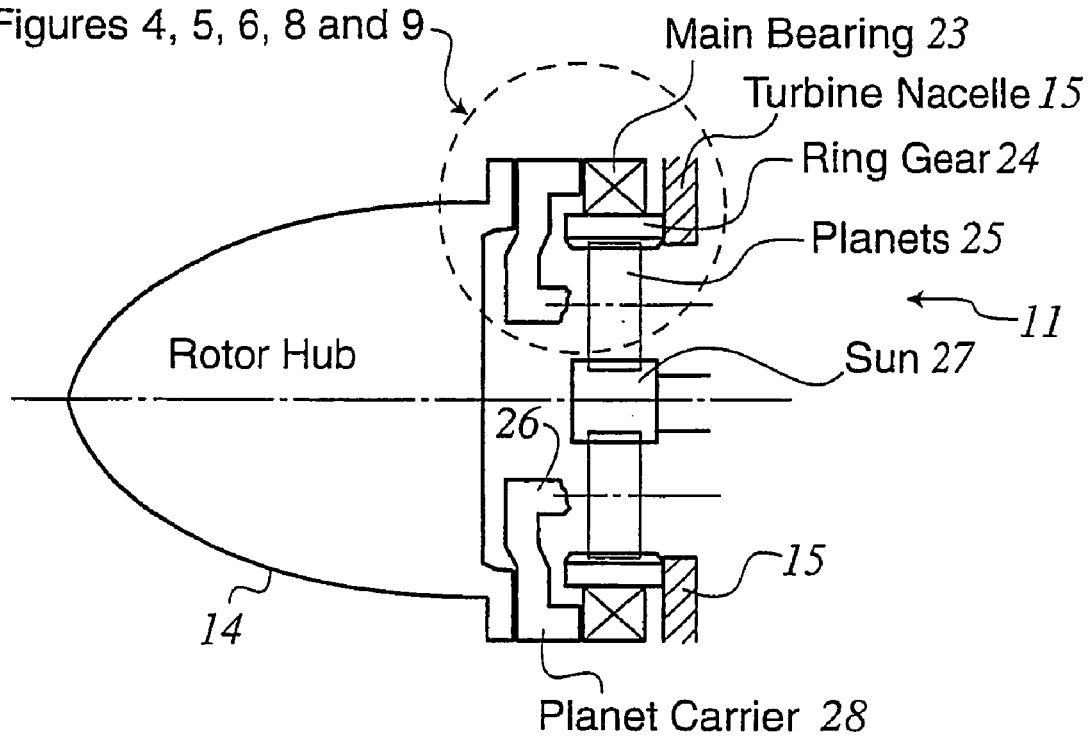
FIG. 2 is a sectional view of part of a gear transmission unit.
Figure 3:
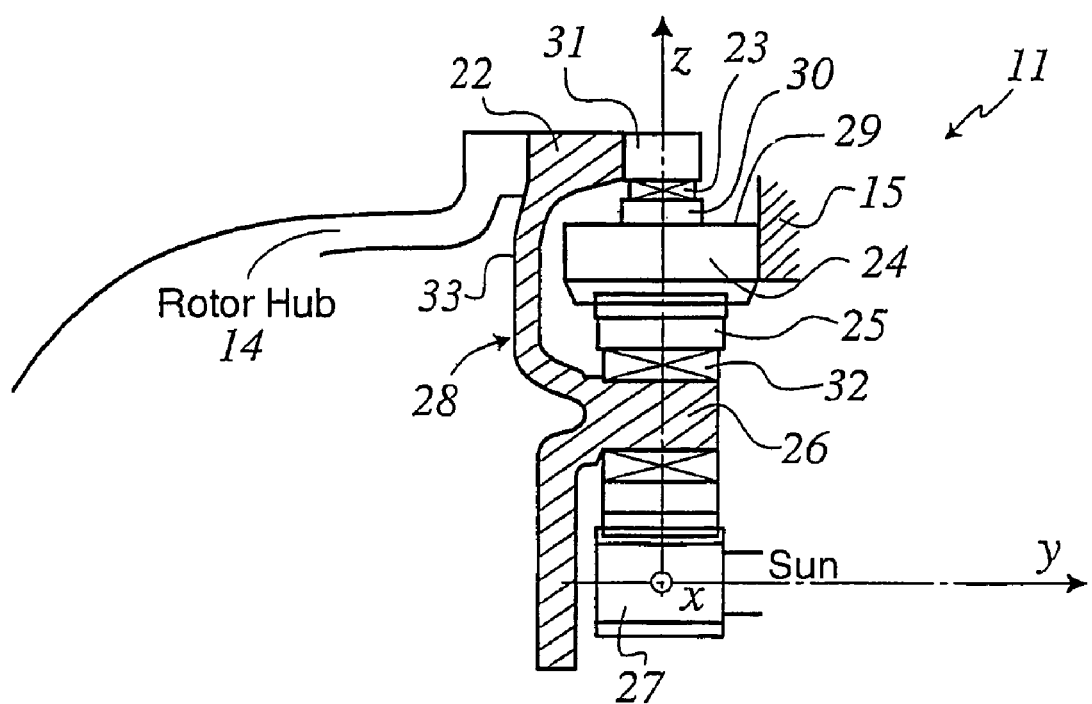
FIG. 3 shows part of FIG. 2 in more detail.
Figure 4:
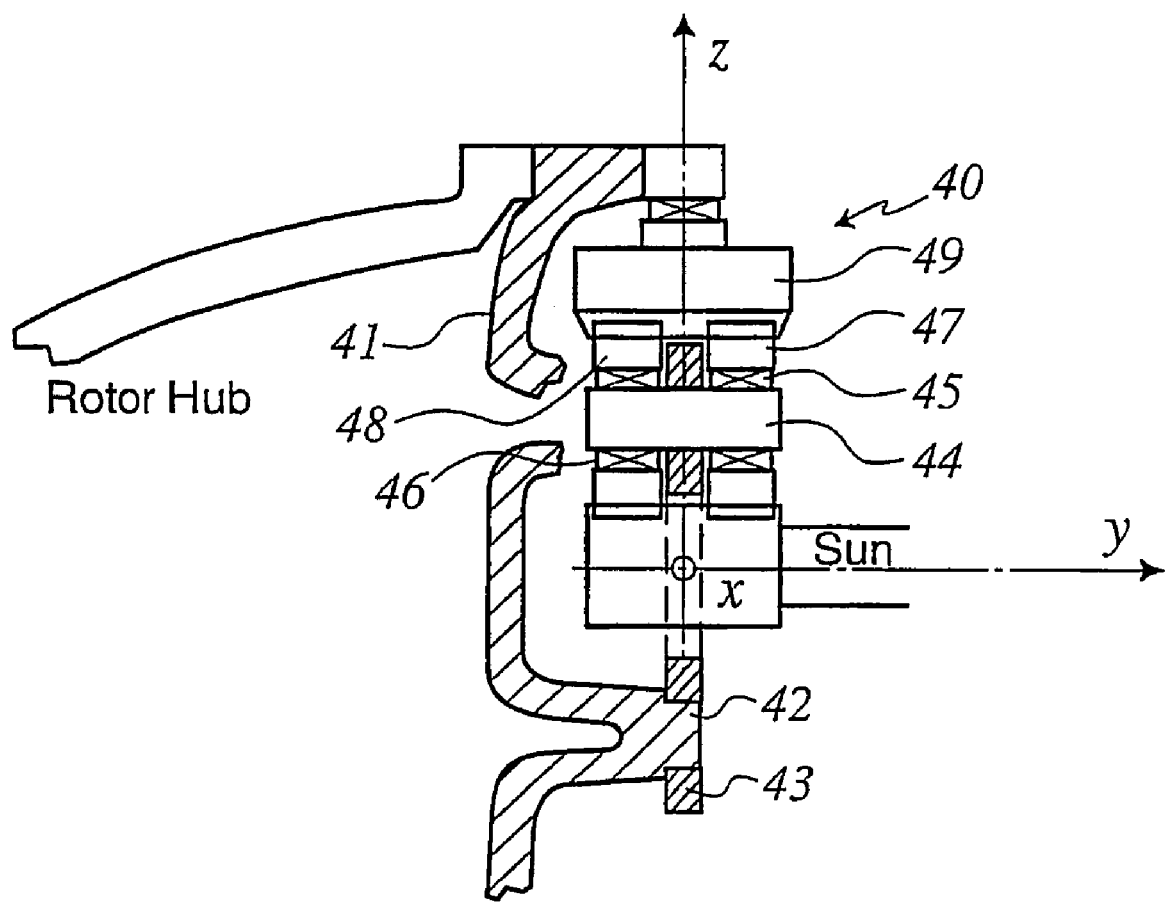
Figure 5:
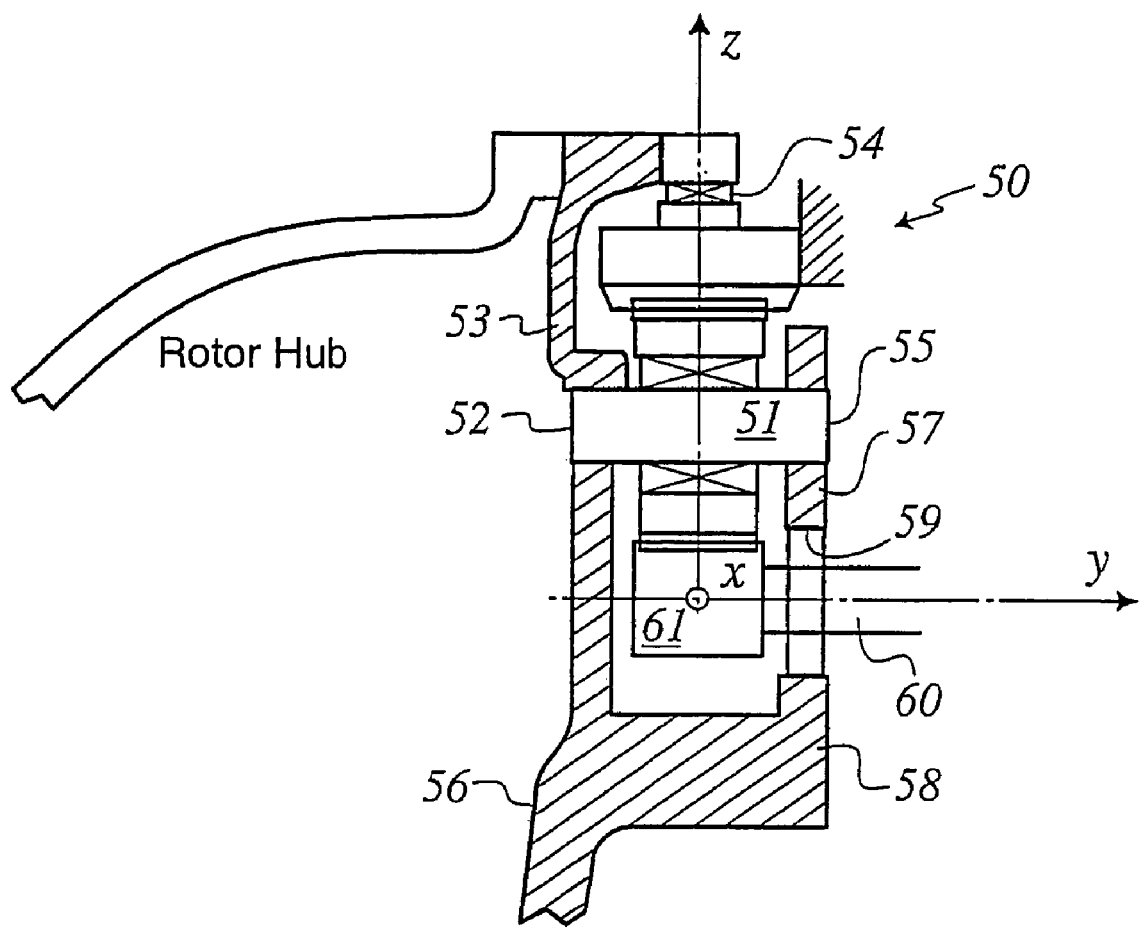
Figure 6:
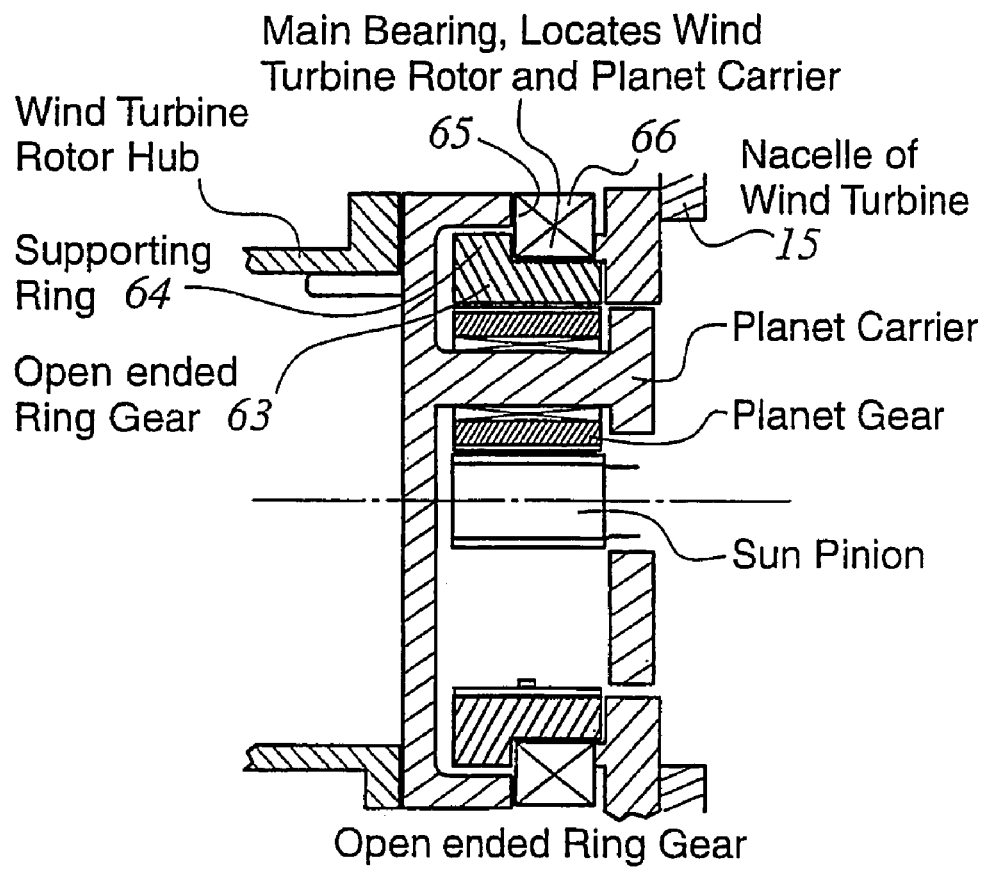
Figure 7:
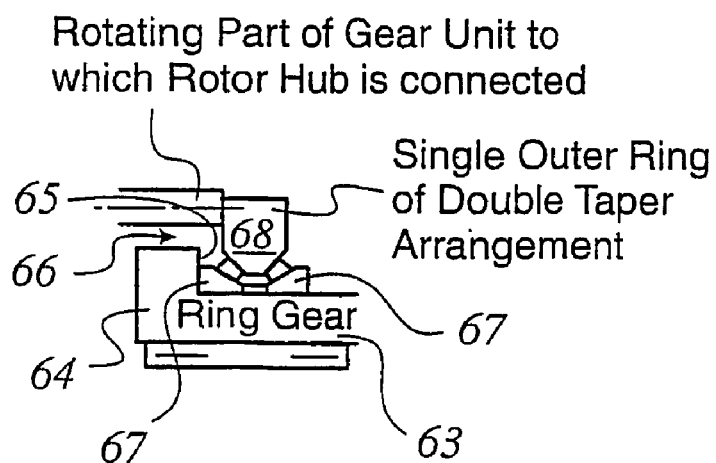

FIGS. 4, 5 and 6 each show variations of the construction of FIGS. 2 and 3;

FIG. 7 shows part of FIG. 6 in more detail, and

Figure 8:
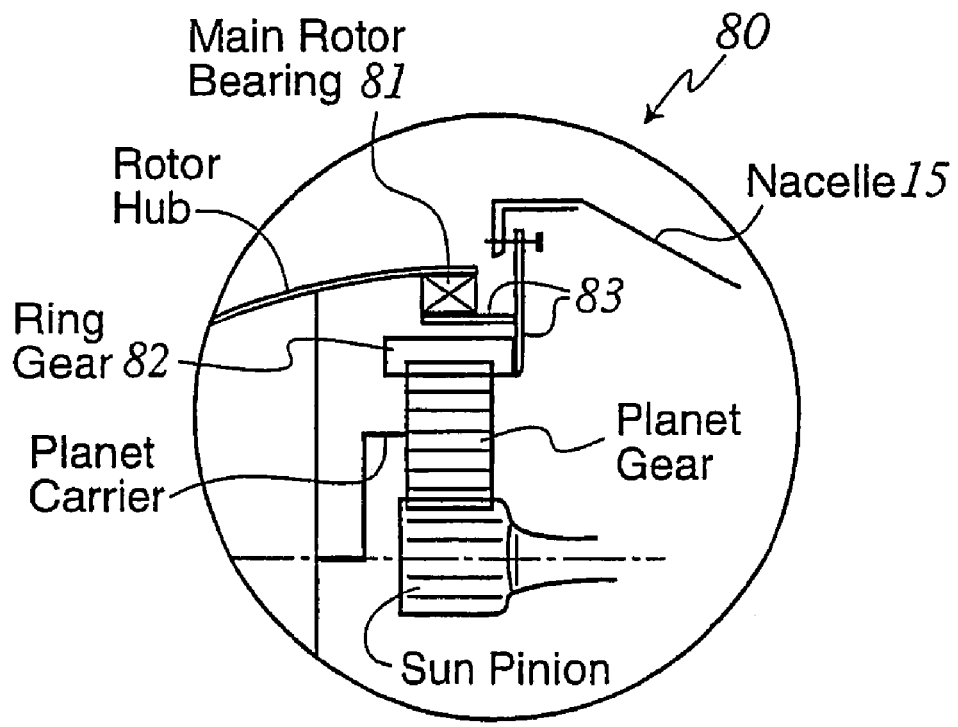
Figure 9:
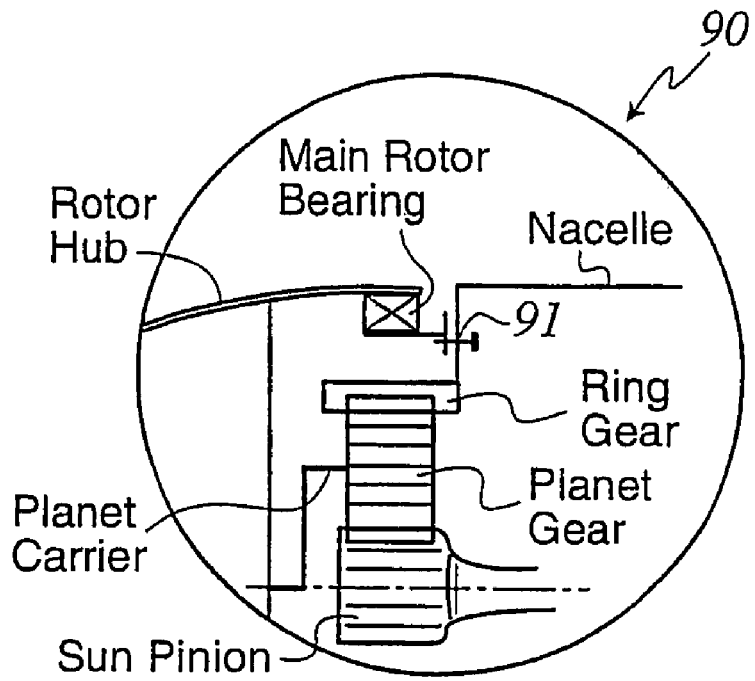

FIGS. 8 and 9 each show further variations of the construction of FIGS. 2 and 3.

Figure 1:
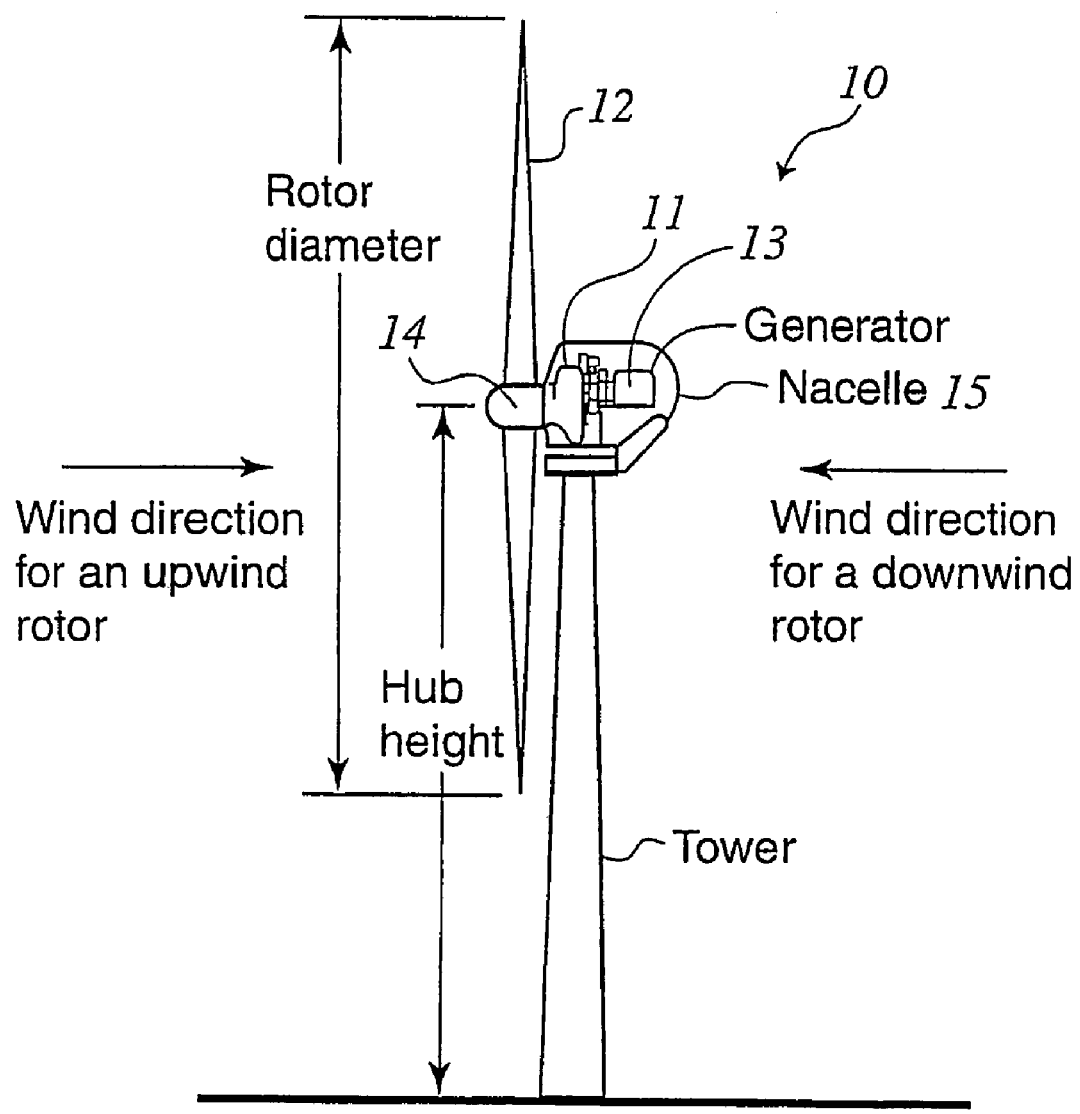
FIG. 1 is an elevation view of a wind turbine having a drive assembly of the present invention.

A wind turbine 10 (see FIG. 1) comprises a gear transmission unit 11 which acts to transmit torque from rotor blades 12 and rotor hub 14 to an electrical generator 13, the gear transmission unit comprising an epicyclic gear unit. The gear transmission unit and generator are housed in and supported by a nacelle 15.

The gear transmission unit 11 is now described in more detail with reference to FIGS. 2 and 3. The gear transmission unit 11 comprises an epicyclic gear unit having four planet gears 25, a sun gear 27 a planet carrier 28, and a ring gear 24 which is non-rotatably mounted relative to the nacelle structure 15.

The sun gear is connected to an output shaft (not shown) which connects either to a further gear unit or direct to the rotor of the generator 13.

The radially outer surface 29 of the ring gear 24 provides location and support for the inner ring 30 of a main bearing 23.

The outer ring 31 of the main bearing has secured thereto the rotor hub 14 and, interposed between the rotor hub and ring 31, the outer region 22 of the planet carrier 28.

The planet carrier 28 comprises four bearing support studs 26 uniformly circumferentially spaced to locate bearings 32 which rotatably support the four planet gears 25. The planet carrier 28 has an annular region 33 which extends radially between the radial position of the bearing studs 26 and the outer region 22 and is designed to be relatively stiff, in a circumferential direction about the Y axis, for transmission of torque between the region 22 and the bearing studs 26, but to be relatively flexible about the X and Z axis.

In the aforedescribed construction the torque acting on the rotor hub 14 under action of the rotor blades 12 is transmitted to the planet gears 25 via the planet carrier 28 rotatably mounted at is outer region 22 to the outer ring 31 of bearing 23. Bending moments and axial forces in the Y direction exerted by the rotor hub in this construction are transmitted direct to the bearing 23. The flexibility of the annular portion 33 of the planet carrier 28 assists to substantially isolate those forces from the planet gears.

FIG. 4 shows a variation 40 in which, in accordance with the present invention, the planet carrier 41 is provided with three integral and uniformly circumferentially spaced studs 42 which support a planet bogie plate 43. The planet bogie plate 43 provides support for three circumferentially uniformly spaced shafts 44 arranged each to self adjust in angular position on the plate 43. Each shaft 44 provides support, at opposite sides if the plate 43, for a pair of bearings 45, 46 about which each of a pair of planet gears 47, 48 are rotatably mounted for engagement with the ring gear 49.

In a further variation 50, shown in FIG. 5, the planet carrier 56 is of a cage type design. In this construction each of three planet bearing support shafts 51 is supported at one axial end 52 by the part 53 of the planet carrier that extends radially outwards to be supported by the outer ring of the main bearing 54 whilst the other end 55 is supported by an auxiliary driving plate 57 carried by three circumferentially uniformly spaced supports 58 provided at positions interposed circumferentially between the shafts 51. The plate 57 is provided with a central aperture 59 to which an output shaft 60 extends from the sun gear 61.

FIG. 6 shows a further variation of the construction of FIGS. 2 and 3. In this construction the planet carrier is constructed substantially similar to that described with reference to FIG. 5. However the ring gear 63 differs in so far as part of the outer periphery of the gear is surrounded by a reinforcing support ring 64. The reinforcing ring is either formed integrally, e.g. forge rolled, with the outer ring 63 or permanently secured thereto, for example by being a shrink fit thereon. The presence of the support ring, provided axially at a position spaced from the nacelle structure 15 provides an abutment surface 65 for axial location of the inner ring of the main bearing 66. The main bearing 66 may be a double taper type bearing, shown in more detail in FIG. 7. The main bearing comprises an inner ring of a split construction comprising two taper rings 67. The bearing additionally comprises a single outer ring 68 of double taper form.

A further variation of the construction of FIGS. 2 and 3 is shown in FIG. 8. In this construction 80 the inner ring of the main rotor bearing 81 contrasts with aforedescribed constructions in so far as it is not directly mounted on or supported by the ring gear 82. Instead, the inner ring of the bearing 81 is supported by a flange assembly 83 secured to the nacelle structure 15. In the construction 90 of FIG. 9 the bearing inner ring is connected substantially directly to the nacelle structure 15 at position 91.

Whilst the constructions of FIGS. 8 and 9 show that the inner ring of the main bearing is non-rotatably secured relative to the nacelle structure 15, it is to be understood that the outer ring of the main bearing may be secured to the nacelle structure and that the rotor hub and planet carrier may be rotatably supported by the inner ring of the bearing.

In the aforedescribed constructions the sun, planet and ring gears are all substantially aligned with one another as considered in an axial direction parallel with the axis of rotation of the planet carrier. A further feature common to the described embodiments of the invention is that the main bearing comprises an inner ring bearing surface the diameter of which is greater than that of the toothed surface of the ring gear. The substantially direct attachment of the rotor hub to the main bearing results in provision of a torque transmission path which at all radial positions inwards of the toothed surface of the ring gear is substantially independent of the force transmission path by which bending and other forces other than those causing rotation about the rotational axis Y, are transmitted to the nacelle support structure.

A benefit arising from the drive assembly, and the gear transmission unit of the present invention as used in a wind turbine is that the overhung loads generated by the wind turbine rotor blades have only a minimal effect on the planet driving components and on the gear meshing contact of the planetary gear stage. This allows for an increased power rating of the gear transmission unit or a reduction of dimension for a given power rating as compared with hitherto known constructions. It is also to be appreciated that the forces generated in gear meshing of the planets have only a minimal effect on the load distribution over the bearing rollers in the main bearing, thus increasing the load capacity of the main bearing or allowing for reduction of dimensions of that bearing for a given load capability.

The invention of claimed is:

1. A drive assembly for a wind turbine comprising a rotor hub, supporting structure such as a turbine nacelle, a planetary type gear transmission unit comprising sun, planet and ring gears and a planet carrier, said planet carrier comprising a planet bogie plate which supports and locates circumferentially spaced planet gear bearings, said bearings being able, in use, to self adjust in angular position relative to the plate whereby the rotational axes of the bearings may be either perpendicular to the general plane of the bogie plate or depart therefrom.

2. A drive assembly according to claim 1, wherein the bearings support respective pairs of aligned planet gears.

3. A drive assembly according to claim 2, wherein two gears of each pair are positioned at opposite sides of the plate.

4. A drive assembly according to claim 1, wherein the bearings for each circumferentially spaced planet gear position are supported on a shaft which, in use, self adjusts in said angular position relative to the bogie plate.

5. A drive assembly according to claim 4, wherein movement of each shaft relative to the plate is by of a rolling action between bearing surfaces, or a combination of rolling action and sliding movement.

6. A drive assembly according to claim 1, wherein the bogie planets are supported by self aligning bearing comprising one or more of toroidal bearings or spherical roller bearings or cylindrical roller bearings.

7. A drive assembly according to claim 1, wherein the drive assembly comprises said ring gear non-rotatably secured to said supporting structure, a main bearing which rotatably supports the rotor hub and planet carrier relative to said ring gear and supporting structure.

8. A drive assembly accordingy to claim 1, wherein said drive assembly comprises two substantially independent force transmission paths for transmission of forces reacting with forces exerted by the wind turbine rotor hub, a first of said force transmission paths acting from the rotor hub via a main bearing to the supporting structure primarily for transmission of overhang load forces and bending moment forces and a second of said force transmission paths acting from the rotor hub via said planet carrier primarily for transmission of rotational forces.

9. A drive assembly according to claim 1, wherein, as considered in an axial direction parallel with the axis of rotation of the planet carrier, the ring gear is substantially aligned axially with the main bearing.

10. A drive assembly according to claim 1, wherein the assembly comprises a main bearing having an inner ring bearing surface of a diameter greater than that of the toothed surface of the ring gear.

11. A drive assembly according to claim 1, wherein the assembly comprises a main bearing and the sun, planet and ring gears lie in a transverse plane which contains said main bearing.

12. A drive assembly according to claim 1, wherein at all radial positions inwards of the toothed surface of the ring gear the second force transmission path is substantially independent of the first force transmission path.

13. A drive assembly according to claim 1, wherein the second of said force transmission paths comprises a radially extending torque transmission member which is torsionally stiff but relatively compliant in an axial direction parallel with the axis about which the rotational forces act.

14. A drive assembly according to claim 1, wherein the drive assembly comprises a main bearing and an outer ring of the main bearing is connected or adapted for connection to a wind turbine rotor hub.

15. A drive assembly according to claim 1, wherein the drive assembly comprises a main bearing and said main bearing and gear transmission unit are of an integrated construction.

16. A drive assembly according to claim 15, wherein the ring gear provides a bearing surface for rotatable bearing components of the main bearing.

17. A drive assembly according to claim 1, wherein the drive assembly comprises a main bearing which is a double taper bearing.

18. A drive assembly according to claim 17, wherein the double taper bearing comprises a single outer bearing ring and the rotor hub is rigidly secured relative to said single outer bearing ring.

19. A drive assembly according to claim 17, wherein the double taper bearing comprises rollers arranged in an O configuration in which the rollers of one series increase in diameter in a direction away from the rollers of the other series of the pair.

20. A wind turbine comprising rotors, an electrical generator and a drive assembly according to claim 1.

* * * * *